United States Patent
Inoue et al.

(10) Patent No.: US 7,386,642 B2
(45) Date of Patent: Jun. 10, 2008

(54) IO DIRECT MEMORY ACCESS SYSTEM AND METHOD

(75) Inventors: Keisuke Inoue, Kanagawa (JP); Tatsuya Iwamoto, Foster City, CA (US)

(73) Assignee: Sony Computer Entertainment Inc. (JP)

( * ) Notice: Subject to any disclaimer, the term of this patent is extended or adjusted under 35 U.S.C. 154(b) by 510 days.

(21) Appl. No.: 11/045,767

(22) Filed: Jan. 28, 2005

(65) Prior Publication Data

US 2006/0174169 A1 Aug. 3, 2006

(51) Int. Cl.
*G06F 11/00* (2006.01)

(52) U.S. Cl. .......................................... 710/22
(58) Field of Classification Search ................. 710/22, 710/25, 28
See application file for complete search history.

(56) References Cited

U.S. PATENT DOCUMENTS

| | | | |
|---|---|---|---|
| 4,247,894 A | 1/1981 | Beismann et al. | |
| 4,574,350 A | 3/1986 | Starr | |
| 4,636,944 A | 1/1987 | Hodge | |
| 4,716,523 A | 12/1987 | Burrus, Jr. et al. | |
| 4,736,319 A | 4/1988 | DasGupta et al. | |
| 4,751,634 A | 6/1988 | Burrus, Jr. et al. | |
| 4,794,526 A | 12/1988 | May et al. | |
| 4,901,234 A * | 2/1990 | Heath et al. | 710/40 |
| 4,908,750 A | 3/1990 | Jablow | |
| 4,954,948 A | 9/1990 | Hira et al. | |
| 4,980,820 A | 12/1990 | Youngblood | |
| 4,987,529 A | 1/1991 | Craft et al. | |
| 5,003,466 A | 3/1991 | Schan, Jr. et al. | |
| 5,083,258 A * | 1/1992 | Yamasaki | 710/114 |
| 5,088,022 A | 2/1992 | Iwata | |
| 5,099,414 A | 3/1992 | Cole et al. | |
| 5,109,329 A | 4/1992 | Strelioff | |
| 5,111,425 A | 5/1992 | Takeuchi et al. | |
| 5,146,597 A | 9/1992 | Williams | |
| 5,212,795 A | 5/1993 | Hendry | |
| 5,247,671 A | 9/1993 | Adkins et al. | |
| 5,257,375 A | 10/1993 | Clark et al. | |
| 5,283,904 A | 2/1994 | Carson et al. | |
| 5,291,609 A | 3/1994 | Herz | |
| 5,379,381 A | 1/1995 | Lamb | |
| 5,379,434 A | 1/1995 | DiBrino | |
| 5,390,300 A | 2/1995 | Pribnow et al. | |
| 5,452,452 A | 9/1995 | Gaetner et al. | |

(Continued)

FOREIGN PATENT DOCUMENTS

EP 0 602 858 A 6/1994

(Continued)

OTHER PUBLICATIONS

Furman, Roy, "Interrupt handling with VxDs optimizes multitasking OS" Personal Engineering, Jan. 1996.

*Primary Examiner*—Christopher S McCarthy
(74) *Attorney, Agent, or Firm*—Lerner, David, Littenberg, Krumholz & Mentlik, LLP (57) ABSTRACT

Direct memory access is provided for each member of a group of IO devices organized into groups. Direct memory access for each IO device is performed in a predetermined order based on the predetermined groups, and may be completed by notification by an interrupt request. A predetermined time delay may be specified between each memory access by each IO device of a predetermined group.

17 Claims, 4 Drawing Sheets

U.S. PATENT DOCUMENTS

| | | |
|---|---|---|
| 5,469,571 A | 11/1995 | Bunnell |
| 5,515,538 A | 5/1996 | Kleiman |
| 5,553,293 A | 9/1996 | Andrews et al. |
| 5,555,383 A | 9/1996 | Elazar et al. |
| 5,560,019 A | 9/1996 | Narad |
| 5,590,380 A | 12/1996 | Yamada et al. |
| 5,606,703 A | 2/1997 | Brady et al. |
| 5,613,128 A | 3/1997 | Nizar et al. |
| 5,652,848 A | 7/1997 | Bui et al. |
| 5,696,976 A | 12/1997 | Nizar et al. |
| 5,701,495 A | 12/1997 | Arndt et al. |
| 5,768,599 A | 6/1998 | Yokomizo |
| 5,777,629 A | 7/1998 | Baldwin |
| 5,794,072 A | 8/1998 | Nomura et al. |
| 5,822,595 A | 10/1998 | Hu |
| 5,875,343 A | 2/1999 | Binford et al. |
| 5,892,956 A | 4/1999 | Qureshi et al. |
| 5,907,712 A | 5/1999 | Slane |
| 5,944,800 A | 8/1999 | Mattheis et al. |
| 5,966,543 A | 10/1999 | Hartner et al. |
| 5,974,522 A | 10/1999 | Torng et al. |
| 5,995,745 A | 11/1999 | Yodaiken |
| 6,115,778 A | 9/2000 | Miyake et al. |
| 6,148,361 A | 11/2000 | Carpenter et al. |
| 6,199,124 B1 | 3/2001 | Ramakrishnan et al. |
| 6,219,741 B1 | 4/2001 | Pawlowski et al. |
| 6,275,749 B1 | 8/2001 | Saville et al. |
| 6,289,369 B1 | 9/2001 | Sundaresan |
| 6,347,349 B1 | 2/2002 | Neal et al. |
| 6,385,638 B1 | 5/2002 | Baker-Harvey |
| 6,418,496 B2 | 7/2002 | Pawlowski et al. |
| 6,430,643 B1 | 8/2002 | Arndt |
| 6,473,780 B1 | 10/2002 | Barcelo |
| 6,490,642 B1 | 12/2002 | Thekkath et al. |
| 6,601,120 B1 | 7/2003 | Schimmel |
| 6,606,676 B1 | 8/2003 | Deshpande |
| 6,629,252 B1 | 9/2003 | Gholami et al. |
| 6,633,942 B1 | 10/2003 | Balasubramanian |
| 6,647,431 B1 | 11/2003 | Utas |
| 6,665,760 B1 * | 12/2003 | Dotson ................ 710/240 |
| 6,701,405 B1 * | 3/2004 | Adusumilli et al. ........ 710/308 |
| 6,813,665 B2 | 11/2004 | Rankin et al. |
| 6,920,516 B2 | 7/2005 | Hartwell et al. |
| 2005/0120147 A1 * | 6/2005 | Koyama .................... 710/22 |
| 2006/0179198 A1 | 8/2006 | Inoue et al. |
| 2006/0206634 A1 * | 9/2006 | Torisaki et al. ................ 710/22 |

FOREIGN PATENT DOCUMENTS

| | | |
|---|---|---|
| JP | 05-204867 | 8/1993 |
| JP | 2005-004562 | 1/2005 |
| JP | 07-160656 | 6/2007 |

* cited by examiner

IO DIRECT MEMORY ACCESS SYSTEM AND METHOD

BACKGROUND OF THE INVENTION

Direct memory access or "DMA" refers to concept of performing data transfer without the involvement of the processor or CPU. In response to certain stimuli or commands, a direct memory access device can move data from one memory location or region to another location or region.

As a general matter, general purpose processors are not designed to be efficient in simply transferring data from one memory location to another. It can therefore waste precious processor cycles for a general purpose processor to repeatedly load data and store data to another location, even though a processor can perform these memory access related tasks. In most cases, the use of direct memory access control can free the processor from performing repeated loads and stores, which allows a processor's cycle time to be used for more meaningful processing tasks.

DMA controllers in general are devices that are designed to do repeated memory loads and stores only, but to do so efficiently. More recently, DMA controllers are now being embedded into input/output ("IO") devices that handle large data transfers, such as network controllers and disk controllers. These embedded DMA controllers transfer the data to and from the memory, from and to the network, disk drive, or wherever the data should be moved. In this manner, the processor will only be disturbed by the notification of an "interrupt" indicating the data is now ready or was sent to the desired location.

While many IO devices now include embedded DMA controllers, many legacy IO devices do not. In such cases, legacy IO devices can require that the processor itself copy data by doing loads and stores. Such IO devices are generally known as PIO (Programmed Input/Output) devices, which require each step of input and output data transfer to be programmed. Typically, slower devices like modems and printers, which do not directly interface with the processor, may be attached to the computer system via serial ports (UARTS) and parallel ports, which are PIO devices. PIO devices can require the CPU to move data to or from the device as each byte is ready, by responding to an interrupt or polling. Thus, in many cases, these PIO devices require certain state checking and waits or other sequential register accesses to operate.

General purpose DMA controllers are designed for efficiency of data transfer. But no matter how efficient the transfer of data may be, slow IO devices are still slow, and there is a need to perform the chores of complicated data access sequences to and from IO devices but in a manner to allow the processor to be freed up from these tasks. Further, IO devices can require strict ordering (sequential access) and even devices with embedded DMA capability may require strictly ordered access to its registers.

Memory ordering or consistency, that is, the way a processor reads the result of a memory write, is an important concept, especially for multi-processor systems. Many forms of memory consistency exist, such as strict ordering (e.g., sequential consistency) and loose ordering (e.g., release consistency). To ensure strict ordering, program order and write atomicity must exist. With program order, previous memory operations are completed before beginning other memory operations. With write atomicity, where more than one copy of data exists, such as with cache-based systems, writes to memory must be visible in the same order to all processors. Additionally, updated memory values after a write operation are not returned to a read before all updates or invalidations of the data are acknowledged.

Loose ordering (or release consistency) refers to a weakly ordered classification of memory operations into data and synchronization operations where program order is enforced by allowing any operations between two synchronization operations to be reordered. The synchronization operation consists of acquired operations and release operations. Release operations are write operations that grant permission to a shared memory location. Acquire operations are read operations that access shared memory locations. Release operations ensure that memory accesses before the operation have been completed while acquire operations require all prior memory accesses to be complete before the operation completes. System busses may be designed with loose ordering to allow multiple transactions to be completed out of order. This can enable better utilization of the bus bandwidth. However, transactions are likely to have different latencies. A read requires the results to be returned from the target, whereas a write can be considered completed as soon as it is issued. But the actual completion of the write requires that the value be written in the target address so that it will return that value when read back.

Main processors typically operate at high frequencies according to the release consistency or loose ordering memory access model. This model generally causes memory access to be performed out of order. Given the speed of the processor, responses to interrupts result in long stall times.

With cache memory systems, when applications on a computer system begin, instructions and data are moved from hard disk into main memory so that a processor can access the data and instructions more quickly. Dynamic random access memory (DRAM) generally is the main memory which serves as the cache memory for the hard disk. When a processor locates data in one of its cache memories, it is referred to as a "hit." There may be many levels of cache memory, some located on the processor or separate from the processor. A failure to locate data in one of the cache locations is called a "miss." Each miss introduces a delay or latency. In connection with the use of a high speed processor, a long cache miss latency is associated with processor interrupt responses. Most high performance systems are designed to execute memory accesses out-of-order in an effort to achieve maximum bandwidth. However, with DMA engines, IO devices require in-order accesses. In other words, such DMA engines do not allow accesses to different IO devices while a first processor runs to access a first IO device. A need therefore exists for an IO direct memory access method and device that provides improved, in-order access to IO devices when used with a high performance processor system.

Although a loosely ordered memory model and high frequency processors are often combined together to provide high performance, these are really two different things. For such a combined system, the high processor frequency means that any time the processor spends waiting or idle translates to more processor cycles being wasted. In a loosely ordered memory system, strictly ordered accesses are special cases, and they are generally slower. But since IO device access in such systems requires many of these strictly ordered accesses, there is also a need to be able to performed ordered IO device access for each of the devices that such a system targets to control.

SUMMARY OF THE INVENTION

In accordance with a preferred aspect of the present invention, there is provided a method of providing direct memory access for a computer system, including a assigning a plurality of IO devices to predetermined groups, and performing direct memory access for each IO device in a predetermined order based on the predetermined groups. Preferably, the direct memory access for each IO device is completed by notification by an interrupt request. Direct memory access also preferably occurs for the IO devices according to a predetermined order within each said predetermined IO group.

The direct memory access can also be accomplished in connection with a memory access request format comprising an IO group identification tag, a predetermined time delay and a command. The memory access request format may further comprise a time delay between execution of commands, a memory address, an IO address size, access size, mask and immediate data. Preferably, the IO devices are assigned to respective groups of IO devices on the basis of a predetermined access sequence.

In another preferred aspect of the present invention, a method of providing direct memory access for a computer system is provided, comprising assigning a plurality of IO devices to a respective predetermined group of IO devices for obtaining memory access, performing memory access for one or more of the IO devices according to a predetermined order, and providing a specified time delay between each memory access by each IO device of a predetermined group. Here, the direct memory access can be accomplished in connection with a memory access request format comprising an IO group identification tag, a predetermined time delay and a command. The memory access request format may include a time delay between execution of commands, a memory address, an IO address size, access size, mask and immediate data.

The predetermined group of IO devices can be capable of processing data within a predetermined period of time, and the IO devices are preferably assigned to the respective group of IO devices on the basis of a predetermined access sequence.

Another aspect of the present invention provides a direct memory access computer system comprising an IO direct memory access controller, a memory, a plurality of IO devices, and a processor, where the IO direct memory access controller, the memory and the plurality of IO devices are in communication via a common bus. The direct memory access controller performs direct memory access for each IO device in a predetermined order based on the predetermined groups.

Preferably, the IO devices are assigned to the respective group of IO devices on the basis of a predetermined access sequence. The IO devices may be legacy IO devices which do not include embedded direct memory access control. The IO devices may also include both legacy IO devices which do not include embedded direct memory access control and IO devices that include direct memory access control. The IO devices can include direct memory access control.

Another aspect of the present invention provides a medium storing instructions to cause a one or more processors to provide direct memory access for a computer system, comprising instructions for assigning a plurality of IO devices to predetermined groups, and performing direct memory access for each IO device in a predetermined order based on the predetermined groups.

Yet another aspect of the present invention provides apparatus for providing direct memory access to a plurality of IO devices assigned to predetermined groups. The apparatus includes a processing element including one or more processing units and an IO direct memory access controller connected via a bus, with the one or more processing units being connectable to a memory and operable to issue instructions. One or more of the processing units are programmed to enable the direct memory access controller to perform direct memory access for the plurality of IO devices in a predetermined order based on the predetermined groups.

BRIEF DESCRIPTION OF THE DRAWINGS

Applicable reference numerals have been carried forward.

DETAILED DESCRIPTION OF THE INVENTION

The invention generally relates to use of an input/output (IO) direct memory access engine, such as an IO DMA controller (DMAC), to support both IO legacy devices that lack the embedded DMA controller as described above, such as PIO devices, as well as other circumstances where strictly ordered access to the IO devices or memories thereof is required. The present invention makes use of an IO DMA controller that can handle memory access chores of such legacy devices for the processor and therefore improves overall processing speed of the system.

The IO DMAC engine can be used in any computer processing system where data access to IO devices, including legacy IO devices without embedded DMACs, is required and it is desired to free up the system's main processor (and/or subprocessors) from performing such data access tasks. It can also be used where strictly ordered memory access is required, for instance, in order to transfer data in and out of a computer system where the IO devices have control registers that are used to check or modify the state of the device, and access to these control registers needs to be done in a predefined order. Also, other devices in a computing system that have a state transition that can be controlled by certain register access may require the access to the control registers to be ordered to properly change that state of the device.

Figure 1:
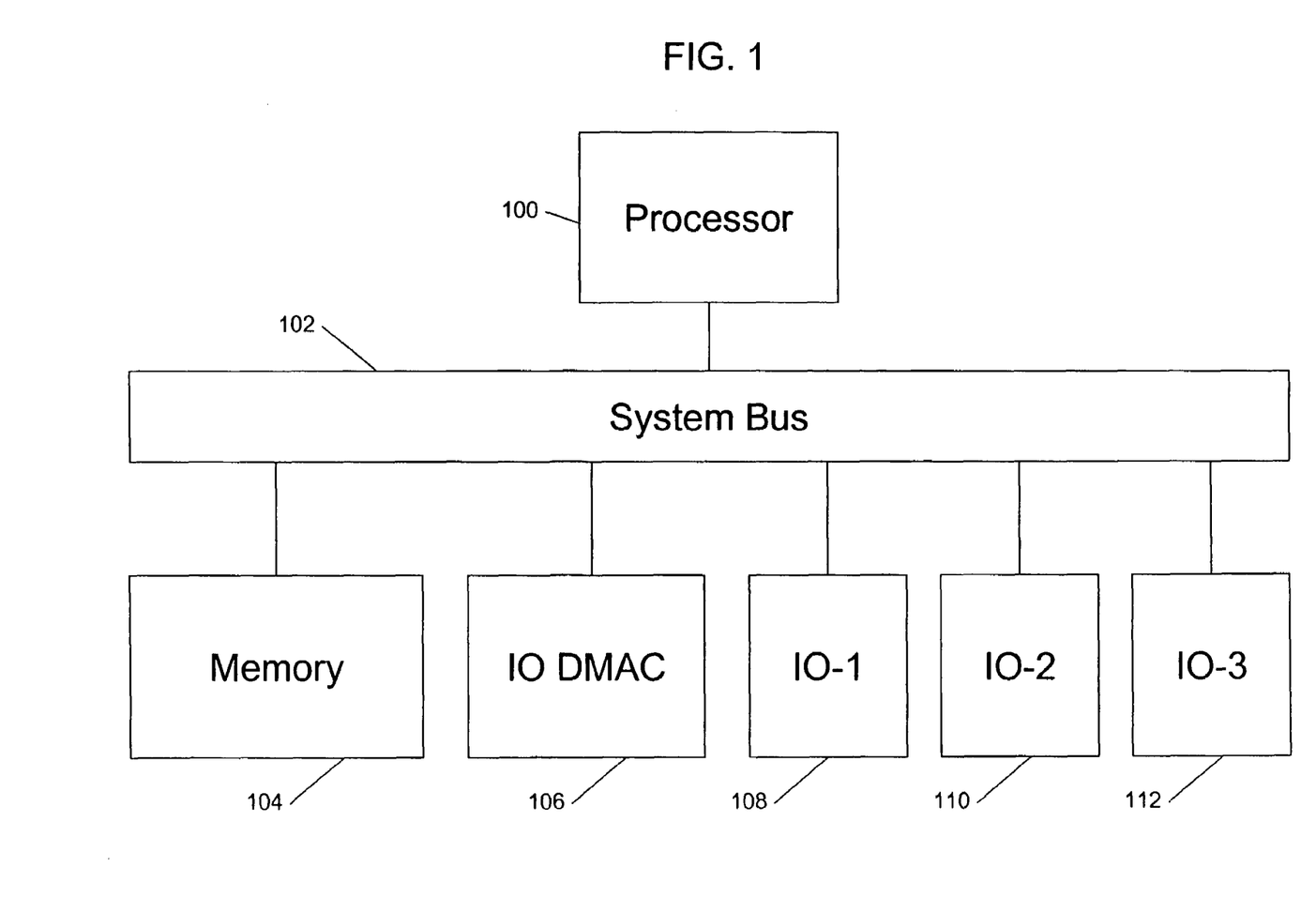
FIG. 1 is a schematic drawing of a processor system including an IO DMA controller (IO DMAC) connected to various addressable IO devices in accordance with the present invention.

FIG. 1 shows a schematic diagram of a processor system that uses an IO DMAC to access various I/O devices. In particular, the system includes a main processor 100, which can be a general purpose processor or central processing unit, which communicates with a memory 104, IO DMAC 106 and IO devices IO-1, IO-1 an IO-3 (reference numbers 108, 110 and 112 respectively) via a system bus 102. The 104 memory can be any type of memory used by such computer systems, such as any form of RAM memory (DRAM, SRAM, etc.).

One or more IO devices such as IO devices 108, 110 and 112 are provided and can be current or legacy IO devices such as network interfaces, disk drive controllers, modems, etc. Although a common system bus configuration is preferred and shown for illustration purposes in FIG. 1, other bus configurations could be used depending on the system architecture, such as use of a separate bus for the IO DMAC 106.

Figure 2:
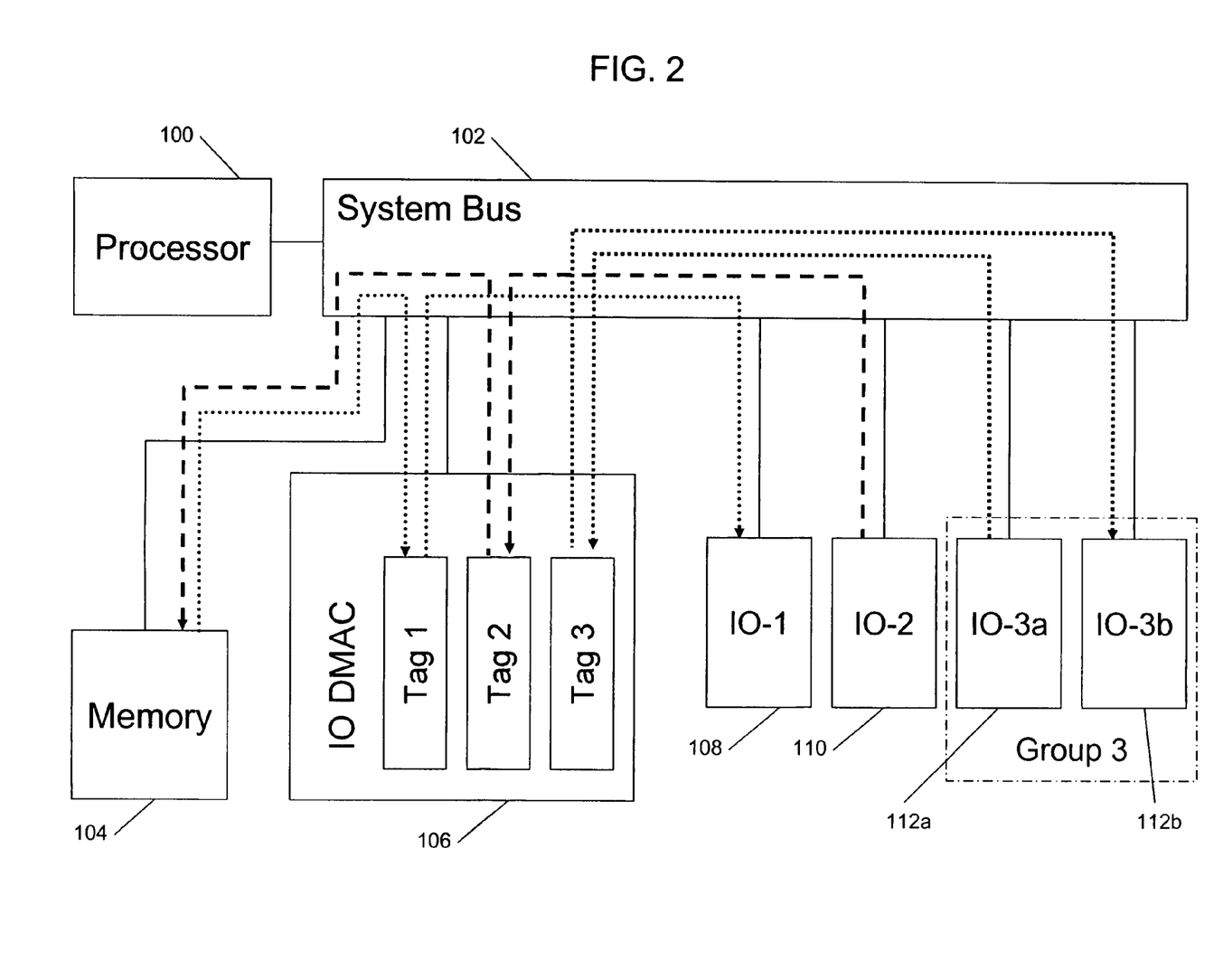
FIG. 2 is a schematic drawing illustrating the addressing of various IO devices by the processor system of FIG. 1 in accordance with the present invention.

FIG. 2 is a schematic drawing illustrating the memory addressing of various IO devices by the processor system of FIG. 1 in accordance with the present invention. Namely, pursuant to a preferred aspect of the present invention, direct memory access is performed according to a predetermined manner or pattern; namely, I/O devices are grouped to maintain a desired sequential access. For instance, a group of IO devices could consist of two or more functional IO devices that require access to them in a predefined sequence. This is illustrated in FIG. 2, which shows IO devices IO-3*a* and IO-3*b* as two devices of IO Group 3, which are to be accessed in the sequential order of IO-3*a* first, then IO-3*b* second. "Groups" can consist of one or more IO devices.

To account for and enable sequential direct memory access to the plurality of IO devices and groups of IO devices, a tagging system is preferably used by the IO DMAC 106. For example, tags denoted as Tag 1, Tag 2 and Tag 3 are used to enable the IO DMAC to perform memory access for each IO device in a specified sequential order, such as the order of: IO-1, IO-2 then the IO devices in Group 3, in the order of IO-3*a* then IO-3*b*. The tagging not only provides sequential access to the groups of IO devices alone and when grouped, but also specifies the order of access of the IO devices within a group of devices.

IO DMAC 106 additionally can manage interrupt requests for the IO devices.

Each IO device or groups of IO devices can request data according to a predetermined format including command parameters which preferably include: a source address; a destination address; a size (e.g., the total size of the memory transfer) or mask (i.e., access mask); access size (e.g., the size that should be used for each access); a group identification tag number (for the purpose of identifying the group and providing group ordering); a predetermined time delay (between execution of each command); data (e.g., immediate data); and a command (e.g., get, put, put immediate data, or poll register).

A brief description of sample commands along with details concerning certain parameters for the commands are provided below:

PUT—The Put command specifies the transfer of typically a large amount of data from memory to a memory mapped device buffer. Along with the specification of a tag delay, memory address, IO address, size and access size, the delay in specifying the PUT command is applied after each memory transfer command before the next command is executed. When specifying the PUT function, the access size can be specified according to the device that requires a specific access size. Consequently, PUT data transfers can be broken up to fit the access size specified.

GET—The GET command transfers large amounts of data from a memory-mapped device buffer into main memory. The GET execution occurs in connection with the specification of the tag, the delay, the memory address, the IO address, the size and access size.

PUT FIXED—Data is transferred to a first-in, first-out (FIFO) register. Writes are repeated to the same address according to size and access times. Notably, along with the usual parameters specification, the delay is repeatedly applied after each repeated transfer. Further, the address is not incremented with each repeated transfer of data. Additionally, the access size should be specified so that it matches the size of the FIFO register.

GET FIXED—GET FIXED transfers data to a FIFO register. Writes are repeated to the same address along with the specification of the size and access size.

PUT IMMEDIATE—PUT IMMEDIATE specifies a write of data to a register. This command is useful in connection with access of a certain register in data sequence. This represents a single transfer command. The data parameter specifies that the data is written to a specified IO address with a specified access size.

POLL for CONDITION—POLL for CONDITION provides a waiting function. A specified address is polled until read data masked as determined by the mask parameter matches specified data.

Interrupt Request—An interrupt request causes an interrupt to be sent to the processor. One or more parameters may identify how an interrupt is passed to the processor. A tag specifies the order of the interrupt.

Interrupt Acknowledge—This command clears the interrupt status for the specified tag in the DMA engine.

The direct memory access control scheme of the present invention is particularly useful with non-intelligent IO devices which require rest times between each access of at least a few microseconds (µs) and which require in-order device access. It may also be used in systems that do not use DMA for IO data transfer. The improvement of performance in such systems should be larger although performance should also improve in systems that use DMA, especially where the IO device requires a certain sequence of access that involves waits.

The present invention also addresses the accessing problems with legacy IO devices that do not include built-in DMA controllers and that have long access latency, small register access size and/or complicated access sequences. Access to such IO devices can result in high overhead which can be dramatically reduced with the use of the present invention.

Figure 3:
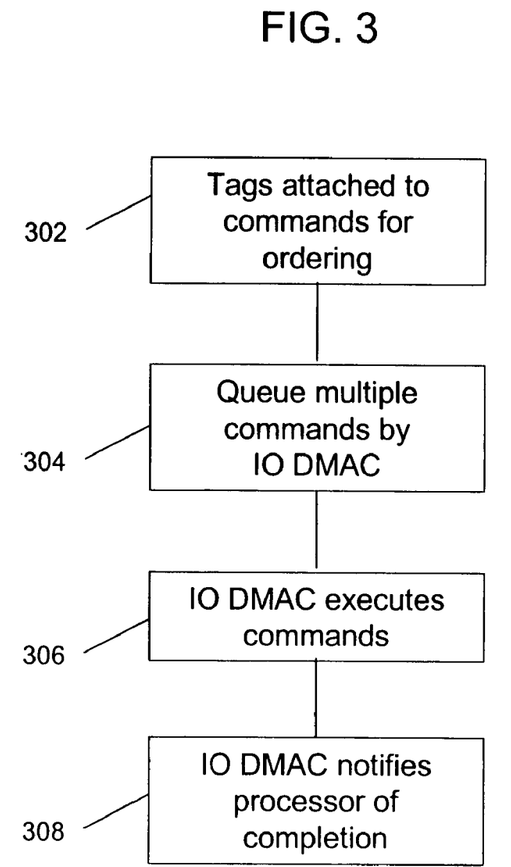
FIG. 3 is a flow chart for processing of tagged access commands in accordance with the present invention.

A flow chart of a preferred implementation of the present invention is provided with reference to FIG. 3. As shown in process block 302, a tag is attached to process commands which specify an order in which direct memory access is to be accomplished. For instance, certain groups of IO devices may have an accessing priority when accessing memory. The tag access command can specify the device, the group, and the priority of access within each group of IO devices. After the commands are ordered, multiple commands are queued by the IO DMAC for execution as indicated in process block 304. Actual storage of the commands can occur somewhere in memory (e.g., DRAM, main memory, etc.). Process block 306 indicates that the IO DMAC executes the commands in the queue according to the order of the queue as specified in part by the tag. So as to maintain memory consistency, the main processor for the system, and any sub-processors involved, are notified of the completion of executed DMA commands as shown by block 308.

A sample sequences of commands to be carried out in queue by the IO DMAC can be as follows:

A) PUT IMMEDIATE; B) PUT FIXED; C) PUT IMMEDIATE; D) POLL for Condition; and E) Interrupt request.

In this sample sequence which can be implemented for example by a serial communication device, the IO device is set to a write mode and a packet of data is written to a FIFO register. The PUT IMMEDIATE command causes a transmit command to be sent to the IO device and the POLL for Condition command checks whether the device receives a signal acknowledging the data transfer from one of its peers. Once the processor queues the foregoing command sequence, it need not interact with the device until receipt of the actual interrupt. The data transmission process pursuant to the direct memory access scheme is completed upon receipt of an interrupt acknowledgement to the processor that the data has been transferred.

Figure 4:
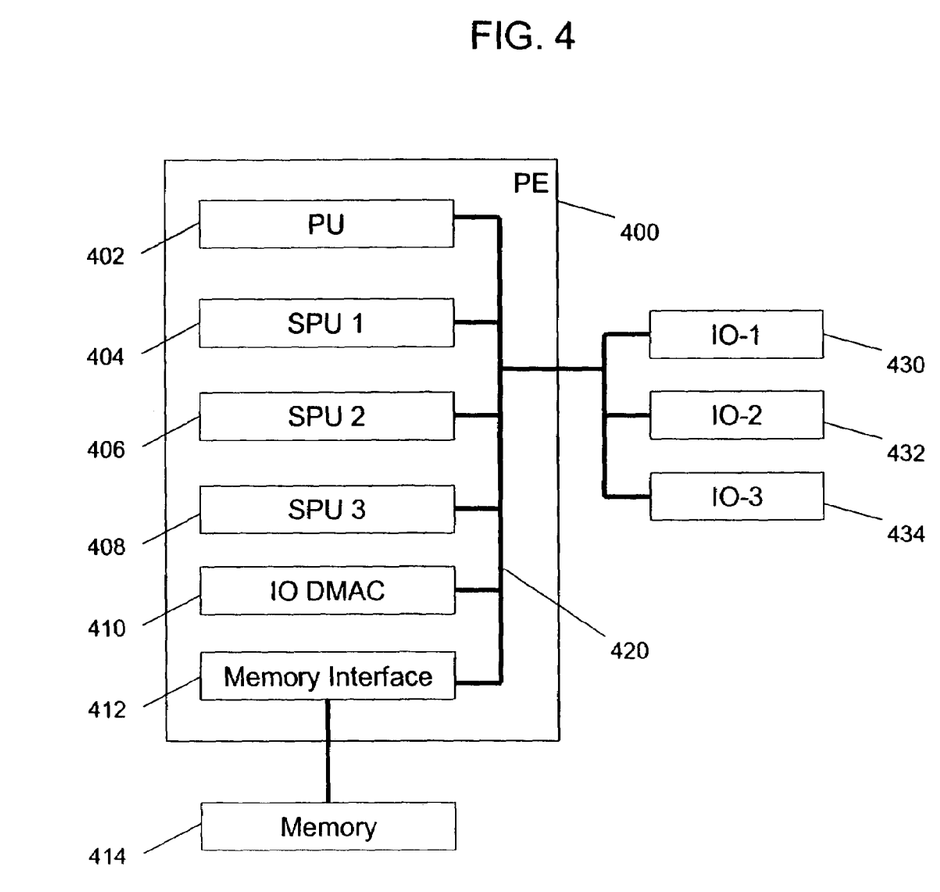
FIG. 4 is a block diagram showing an IO DMAC of a multiprocessor system adapted for use in accordance with the present invention.

As shown in FIG. 4, one example of an architecture that can be used is a multi-processing computer system wherein all processors are constructed from a common computing module (the so-called cell architecture). This common computing module has a consistent structure and preferably employs the same instruction set architecture. A "CELL" or unit of software containing applications and/or data can be executed by any processor that has the same instruction set. The multi-processing computer system can be formed of one or more clients, servers, PCs, mobile computers, game machines, PDAs, set top boxes, appliances, digital televisions and other devices using computer processors.

In this architecture, the basic processing module is a processor element (PE). In this regard, reference is made to FIG. 4, which is block diagram of a basic processing module or processor element (PE) 400. As shown in this figure, PE 400 comprises a processing unit (PU) 402, a plurality of sub-processing units 404, 406, 408, IO DMAC 410 and memory interface 412. A local (or internal) system bus 420 transmits data, commands and applications among the PU 400, sub-processing units 404, 406, 408, IO DMAC 410, memory interface 412, memory 414 and IO devices IO-1, IO-2 and IO-3 denoted as 430, 432 and 434 respectively.

It is noted that IO DMAC 410 may be integrally or separately disposed with respect to PE 400 and can be on-chip of off-chip. IO DMAC 410 in this architecture can be used in accordance with the present invention to address and access specific IO devices alone and/or in groups and implement IO access patterns as previously described.

The present invention can also be used where the computing system has a mixture of legacy IO devices and IO devices with embedded DMA control, or even in systems with only the embedded-type IO devices. In this latter case, the memory access may be performed locally at the IO device, or by the IO DMAC, but the ordering of access of the IO devices can still be directed by the IO DMAC of the present invention. For example, the present invention could be used with a network interface controller (NIC) that has a buffer to store network packets and also has embedded DMA capability to transfer sent or received packets between the buffer and the memory. When sending a packet to the network, the processor would need to prepare in the memory the packet to be sent and it would access the control register on the NIC to set up the DMA to retrieve the packet from memory and then send it out. This sequence may require setting up the address from where the NIC should retrieve the packet, and other parameters required for the packet to be transmitted to the network. The device should also be set up to interrupt the processor when the packet transmission is completed. This sequence of access may require wait delay or status read back in between accesses. All of the accesses are normally done by the processor. But, with the IO DMAC of the present invention, the whole sequence can be set up to be executed sequentially when it is tied to a single tag.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of providing direct memory access for a computer system comprising:
   assigning a plurality of IO devices to predetermined groups; and
   performing direct memory access for each IO device in a predetermined order based on the predetermined groups;
   wherein the direct memory access is accomplished in connection with a memory access request format comprising an IO group identification tag, a predetermined time delay and a command.

2. A method as recited in claim 1, wherein the direct memory access for each IO device is completed by notification by an interrupt request.

3. A method as recited in claim 1, wherein the direct memory access occurs for said IO devices according to a predetermined order within each said predetermined IO group.

4. A method as recited in claim 1, wherein said memory access request format further comprises a time delay between execution of commands, a memory address, an IO address size, access size, mask and immediate data.

5. A method of providing direct memory access for a computer system, comprising:
   assigning a plurality of IO devices to predetermined groups; and
   performing direct memory access for each IO device in a predetermined order based on the predetermined groups;
   wherein said IO devices are assigned to said respective groups of IO devices on the basis of a predetermined access sequence.

6. A method of providing direct memory access for a computer system comprising:
   assigning a plurality of IO devices to a respective predetermined group of IO devices for obtaining memory access;
   performing memory access for one or more said IO devices according to a predetermined order; and
   providing a specified time delay between each memory access by each IO device of a predetermined group;
   wherein the direct memory access is accomplished in connection with a memory access request format an IO group identification tag a predetermined time delay and a command.

7. A method as recited in claim 6, wherein said format further comprises a time delay between execution of commands, a memory address, an IO address size, access size, mask and immediate data.

8. A method as recited in claim 6, wherein said predetermined group of IO devices are capable of processing data within a predetermined period of time.

9. A method of providing direct memory access for a computer system, comprising:
   assigning a plurality of IO devices to a respective predetermined group of IO devices for obtaining memory access;
   performing memory access for one or more said IO devices according to a predetermined order; and
   providing a specified time delay between each memory access by each IO device of a predetermined group;

wherein said IO devices are assigned to said respective group of IO devices on the basis of a predetermined access sequence.

10. A direct memory access computer system comprising:
an IO direct memory access controller;
a memory;
a plurality of IO devices; and
a processor,
said IO direct memory access controller, said memory and said plurality of IO devices being in communication with via a common bus,
said direct memory access controller performing direct memory access for each said IO device in a predetermined order based on the predetermined groups,
wherein said IO devices are assigned to said respective group of IO devices on the basis of a predetermined access sequence.

11. A direct memory access computer system as recited in claim 10, wherein said IO devices include legacy IO devices which do not include embedded direct memory access control.

12. A direct memory access computer system as recited in claim 10, wherein said IO devices include both legacy IO devices which do not include embedded direct memory access control and IO devices that include direct memory access control.

13. A direct memory access computer system as recited in claim 10, wherein said IO devices include direct memory access control.

14. A computer readable storage medium storing instructions to cause a one or more processors to provide direct memory access for a computer system comprising instructions for:
assigning a plurality of IO devices to predetermined groups; and
performing direct memory access for each IO device in a predetermined order based on the predetermined groups;
wherein the direct memory access is accomplished in connection with a memory access request format comprising an IO group identification tag, a predetermined time delay and a command.

15. Apparatus for providing direct memory access to a plurality of IO devices assigned to predetermined groups comprising:
a processing element including one or more processing units and an IO direct memory access controller connected via a bus, said one or more processing units being connectable to a memory and operable to issue instructions, and
wherein said one or more processing units are programmed to enable said direct memory access controller to perform direct memory access for the plurality of IO devices in a predetermined order based on the predetermined groups, and
wherein the direct memory access is accomplished in connection with a memory access request format comprising an IO group identification tag, a predetermined time delay and a command.

16. A computer readable storage medium storing instructions to cause a one or more processors to provide direct memory access for a computer system comprising instructions for:
assigning a plurality of IO devices to predetermined groups; and
performing direct memory access for each IO device in a predetermined order based on the predetermined groups;
wherein said IO devices are assigned to said predetermined groups on the basis of a predetermined access sequence.

17. Apparatus for providing direct memory access to a plurality of IO devices assigned to predetermined groups comprising:
a processing element including one or more processing units and an IO direct memory access controller connected via a bus, said one or more processing units being connectable to a memory and operable to issue instructions, and
wherein said one or more processing units are programmed to enable said direct memory access controller to perform direct memory access for the plurality of IO devices in a predetermined order based on the predetermined groups; and
wherein said plurality of IO devices are assigned to said predetermined groups on the basis of a predetermined access sequence.

* * * * *

UNITED STATES PATENT AND TRADEMARK OFFICE
CERTIFICATE OF CORRECTION

PATENT NO. : 7,386,642 B2  
APPLICATION NO. : 11/045767  
DATED : June 10, 2008  
INVENTOR(S) : Keisuke Inoue and Tatsuya Iwamoto It is certified that error appears in the above-identified patent and that said Letters Patent is hereby corrected as shown below:

Column 1, line 6, "to concept" should read -- to the concept --.
Column 2, line 65, "performed" should read -- perform --.
Column 3, line 5, before "assigning", delete -- a --.
Column 3, line 62, before "one", delete -- a --.
Column 7, line 34, "on-chip of off-chip" should read -- on-chip or off-chip --.
Column 8, Claim 6, line 49, after "format", insert -- , --.
Column 8, Claim 6, line 50, after "tag", insert -- , --.
Column 9, Claim 10, line 11, before "via", delete -- with --.
Column 9, Claim 14, line 31, before "one", delete -- a --.
Column 10, Claim 16, line 16, before "one", delete -- a --.

Signed and Sealed this

Twentieth Day of October, 2009

David J. Kappos
*Director of the United States Patent and Trademark Office*